United States Patent [19] [11] Patent Number: 4,907,682
Hayashi et al. [45] Date of Patent: Mar. 13, 1990

[54] VISCOUS FLUID COUPLING DEVICE

[75] Inventors: Masaharu Hayashi, Toyota; Seiya Tanaka, Bisai, both of Japan

[73] Assignee: Aisin Seiki Kabushiki Kaisha, Kariya, Japan

[21] Appl. No.: 287,671

[22] Filed: Dec. 21, 1988

Related U.S. Application Data

[63] Continuation of Ser. No. 122,687, Nov. 18, 1987, abandoned.

[30] Foreign Application Priority Data

Nov. 21, 1986 [JP]  Japan ............................ 61-179534[U]

[51] Int. Cl.⁴ ........................ F16D 35/00; F16D 43/25
[52] U.S. Cl. .................................. 192/58 B; 192/82 T
[58] Field of Search ........................... 192/58 B, 82 T

[56] References Cited

U.S. PATENT DOCUMENTS 3,227,254 1/1966 Sutaruk ............................ 192/58 B
4,295,550 10/1981 Hayashi ........................... 192/82 T
4,502,580 3/1985 Clancey ........................... 192/58 B
4,702,360 10/1987 Tanaka ............................ 192/82 T

FOREIGN PATENT DOCUMENTS 1425374 2/1969 Fed. Rep. of Germany .... 192/82 T

Primary Examiner—Rodney H. Bonck
Assistant Examiner—David A. Testardi
Attorney, Agent, or Firm—Oblon, Spivak, McClelland, Maier & Neustadt

[57] ABSTRACT

A viscous fluid coupling device especially is used for driving the cooling fan of engines and for controlling the rotation speed of the fan smoothly according to the temperature. The smooth change of torque transmission by the coupling device is performed by employing a specially shaped slot for fluid passageway. The increase rate of the opening area of the slot is smaller in a low temperature region than in a high temperature region.

3 Claims, 3 Drawing Sheets

PPIOR ART

VISCOUS FLUID COUPLING DEVICE

This application is a Continuation of application Ser. No. 122,687, filed on Nov. 18, 1987, now abandoned.

BACK GROUND OF THE INVENTION

1. Field of the Invention

This invention relates to a viscous fluid coupling devices, and more particularly to such coupling devices which transmit torque as a function of the temperature of an associated fluid. More particularly still, the present invention relates to temperature sensitive viscous fluid coupling devices which can control the transmission of the output torque in accordance with temperature, which are employed as vehicle fan devices and which are actuated as a function of temperture.

2. Description of Prior Art

A conventional viscous fluid coupling device is disclosed, for example, in U.S. Pat. No. 3,227,254 to Sutaruk. Such a viscous fluid coupling device is generally comprised of a pulley which is fixed for rotation with a coupling input shaft and supported on the engine. The pulley is adapted to be driven preferably by a belt from the vehicle crankshaft. The coupling input shaft is fixed for rotation with a driving clutch or coupling member and a coupling housing member is mounted for rotation on the input shaft by suitable bearing means. The coupling housing member substantially encloses the driving clutch or coupling member and is adapted to be driven by the driving clutch member through the shear of viscous fluid disposed in the housing. A combination cover and fluid storage assembly means is fixed for rotation with the housing member and is formed by spaced plate portions which define a fluid storage chamber axially adjacent the shear surfaces on the driving clutch member and the coupling body member, respectively.

A valve structure for controlling the flow of fluid from the storage or reservoir chamber to the operating chamber according to the prior art is shown in FIG. 2 and is comprised of an inlet opening disposed formed in the valve plate and a thermostatically operated valve arm which is selectively movable to various positions to completely cover, partially or completely uncover the valve inlet opening. This invention is directed to the disposition and configuration of the inlet valve opening so that the volume of fluid admitted to the viscous coupling or clutch.

A thermostatic means is mounted on the cover plate for positioning the valve arm with respect to the inlet opening. A discharge valve means or opening is disposed or formed in the valve plate and cooperates with a pumping means to evacuate fluid from the operating chamber to the reservoir chamber.

SUMMARY OF THE INVENTION

An object of the present invention is to provide a new means for regulating the volume of fluid in an operating chamber of a shifting coupling to thereby control the power transmitted from the driving member to the driven member.

A further object is to regulate the volume of the fluid in the operating chamber by means of which is operative responsive to the temperature of the air surrounding viscous fluid coupling.

Another object is to regulate an opening between the reservoir and the operating chamber and means to vary the effective the radial distance of the opening from the axis of rotation of the clutch assembly.

These and other object and advantage of the invention will appear from the following description taken with the drawings showing in this part of the specification.

DETAILED DESCRIPTION OF THE PREFERRED EMBODIMENT

A viscous fluid coupling device constructed in accordance with a preferred embodiment of the present invention will be described with reference to the drawings.

Figure 1:
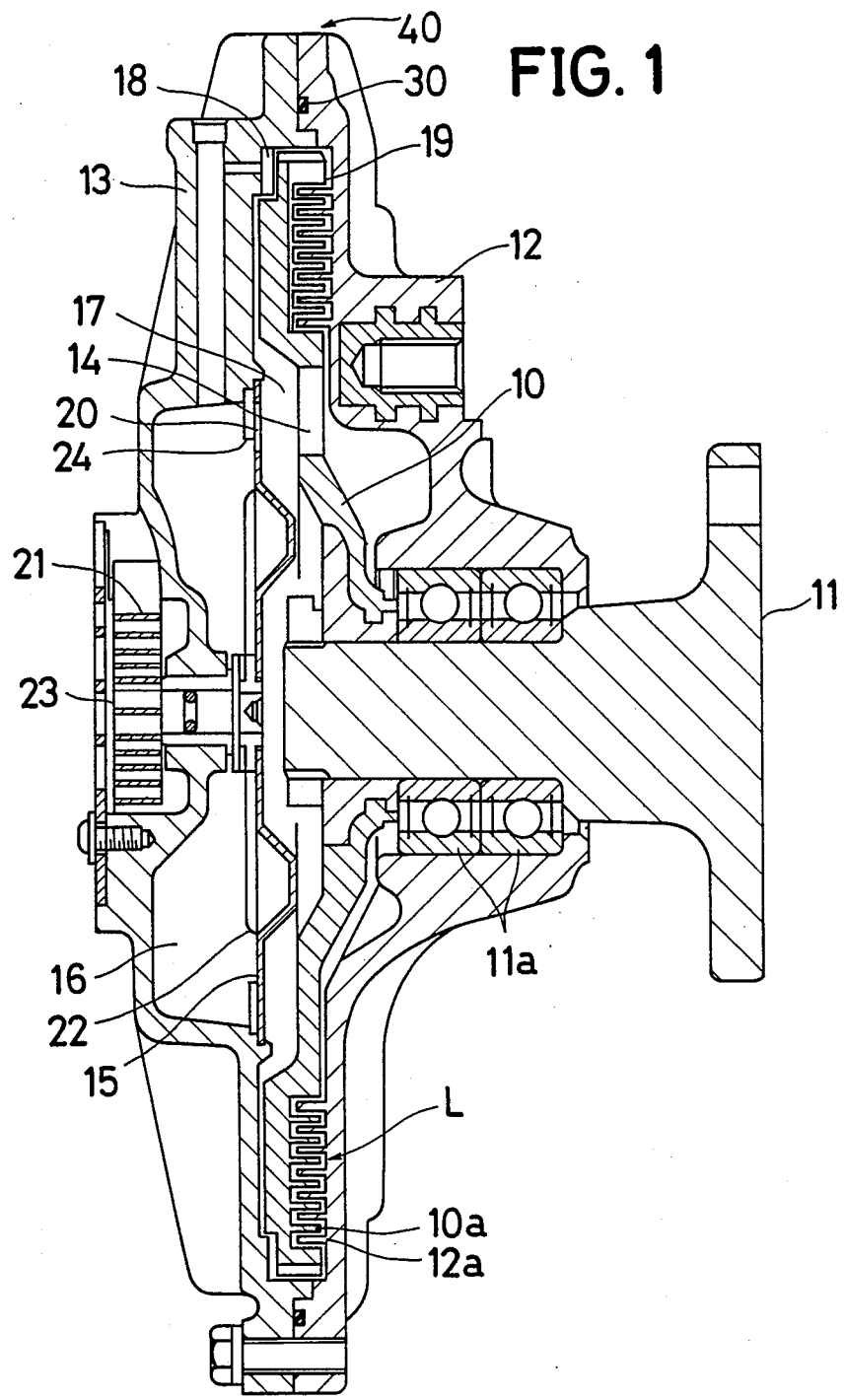
FIG. 1 shows a sectional view of one embodiment of a viscous fluid coupling device in accordance with the present invention.
Figure 2:
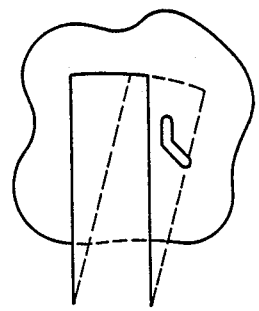
FIG. 2 shows a modification of a valve assembly in accordance with a prior art.
Figure 3:
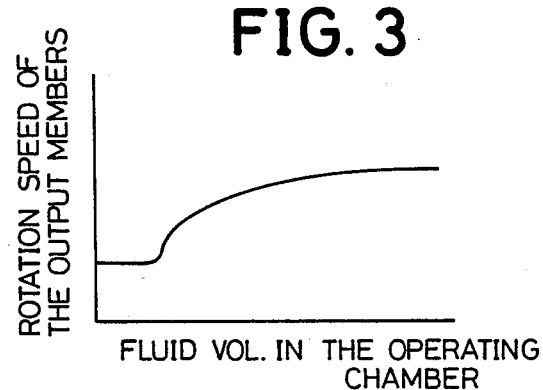
FIG. 3 is a graphical illustration of rotation speed of the output members versus fluid volume in the operating chamber of the embodiment of FIG. 1.

Referring particularly to FIG. 1 of the drawings, a viscous fluid coupling device of the present invention includes a rotor 10 fixed to a input shaft 11 which is arranged as an input member to be driven by a engine (not shown). The rotor 10 has annular projections 10a which are integrally formed with the face of the outer peripheral portion of the rotor 10. The rotor 10 is accommodated in output members 12 and 13. The output members 12 and 13 which are rotatably mounted in a fluid-tight manner on the input shaft 11. The output member 12 is rotatably mounted in a fluid-tight manner on a neck portion of the input shaft 11 by means of sealed ball bearing means 11a. The output member 12 is integrally formed at its inner wall with a set of annular projections 12a which are coupled with the annular projections 10a of rotor 10 to provide a labyrinth L. The housing assembly 40 further includes the output member 12 which is secured in a fluid-tight manner to an opening end of output member 13 through an annular seal member 30. A circular partition wall member 15 is coupled with an annular stepped portion of the output member 13 and secured in place to divide the interior of housing assembly 40 into an operation chamber 17 and a reserver chamber 16. The operation chamber 17 accommodates therein the rotor 10 and a portion of the viscous fluid, while the reservoir chamber 16 stores therein the remaining portion of viscous fluid. On the wall of the rotor 10, a viscous fluid circulation passageway 14 is formed.

The output member 13 is provided at its outer peripheral portion with a pumping mechanism 18. The pumping mechanism 18 feeds the viscous fluid from the operation chamber 17 to the reservoir chamber 16 with pressure. Labyrinth transmitting surface 19 is between the rotor 10 and the output member 12. Passageway 14 leads to torque transmitting surface 19. The slot 20 is formed on the partition wall 15 to supply the viscous fluid from reservoir chamber 16 to operation chamber 17. A non-perforate valve member 22 which controls the opening and closing of slot 20 is rotated on the partition wall 15 by temperature sensitive member 21. The slot 20 and the valve member 22 cooperate to form a opening area 24 when they are in a certain relation. When a spiral bimetal is used as the temperature sensitive member 21, one end thereof is fixed at output member 13 and the other end is fixed to a freely rotatable rod 23 to rotate the valve member 22. For example, the temperature sensitive member 21 comprises a bimetal or a shape memory alloy.

Figure 5:
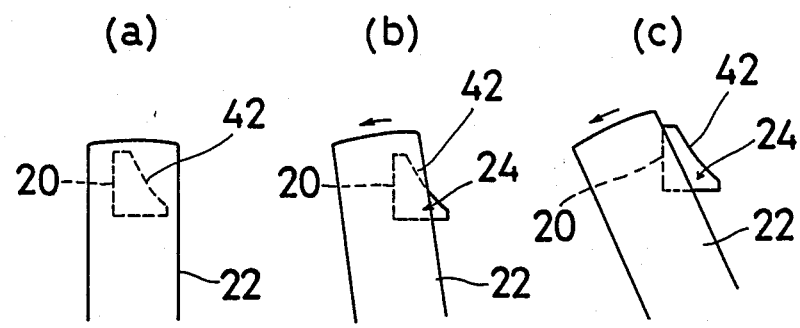
FIG. 5 shows the modification of the valve assembly in accordance with present invention.

In this embodiment, the slot 20 is formed on an outer circumference of the partition wall 15, as shown FIG. 5. The shape of the slot 20 is substantially trapezoidal and has a concave edge which has a gentle inclination with respect to the radial direction. When the temperature of the air surrounding the viscous fluid coupling device is low, that is, when the valve member 22 is in the position shown in FIG. 5(a), the opening area 24 is not formed, and the valve member 22 blocks the slot 20.

When the temperature sensitive member 21 senses the rise of the temperature rise at a low temperature and rotates the valve member 22 to the position, as shown FIGURE 5 (b), the outer edge of the valve member 22 forms the opening area 24. Since the slot 20 has the concave slope edge 42, the increase rate of the opening area 24 becomes lower at a low temperature region. When the temperature of the air surrounding the viscous fluid coupling devices reaches high temperature region, the increase rate of opening area 24 becomes large. FIG. 5 (c) is the state in which the slot 20 is at a high temperature.

Figure 4:
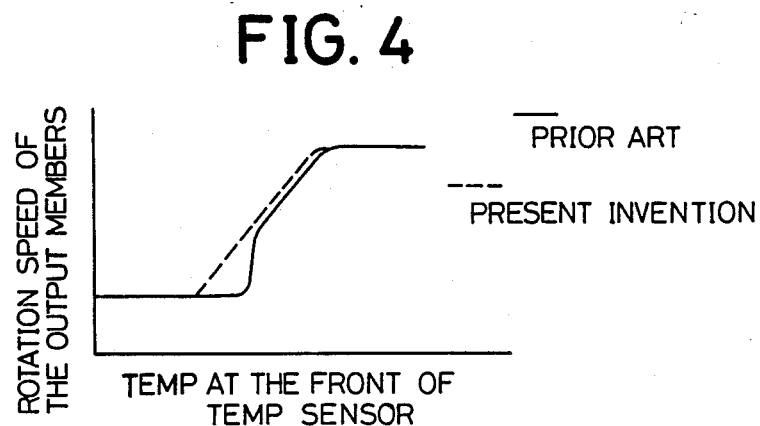
FIG. 4 is a graphical illustration of rotation speed of the output members versus temperature at the front of temperature sensor of FIG. 1.
Figure 6:
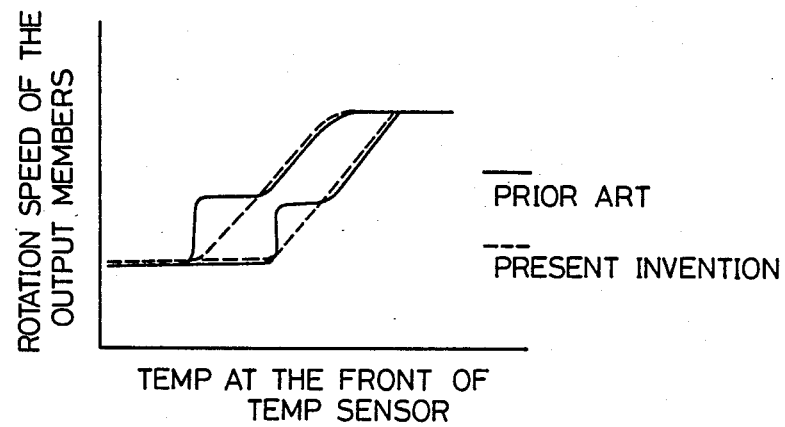
FIG. 6 is a hysteresis curve of rotation speed of the output members versus temperature at the front of temperature sensor of the present invention.

When the viscous fluid coupling device having the above mentioned valve structure is used as a device to drive the cooling fan of the engine cooling system, a rotational speed of the cooling fan proportional to the increase in the ambient temperature can be obtained as shown by the dotted line in FIG. 4. In FIG. 6 shows a hysteresis curve of a rotational speed of the cooling fan of the engine cooling system, a rotational speed of the output members to the increase in the ambient temperature. This embodiment is just one example and it is possible to otherwise properly select the shape of the slot and valve member within the range of technological concept of this invention, for example, by making the shape of the slot of another shape equivalent to that of the slot 20 in the partition wall 15 in the aforementioned embodiment.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A viscous fluid coupling device comprising:
   an input shaft equipped with a rotor,
   an output member equipped with an internal chamber for housing viscous fluid and the rotor,
   a partition wall dividing said internal chamber into an operating chamber for said rotor and a reservoir chamber for viscous fluid and having a slot as a passageway for supplying viscous fluid from said reservoir chamber to said operating chamber,
   a pump mechanism for sending said viscous fluid with pressure from said operating chamber to said reservoir chamber,
   a non-perforate valve member for controlling an opening and closing of said slot, and
   a temperature sensitive member for sensing an air temperature surrounding said viscous fluid coupling device and for moving said valve member to rotate in response to an increase of said temperature, wherein said slot consists of first through fourth interconnected, straight sides and a fifth side comprising a continuously arcuate concave edge, so that an increased rate of said opening area of said slot is smaller in a low temperature region than in a high temperature region.

2. A viscous fluid coupling device of claim 1, wherein a passageway formed in said rotor is arranged adjacent a labyrinth.

3. A viscous fluid coupling device of claim 1, wherein one end of said temperature sensitive member is connected to said output member.

* * * * *